United States Patent [19]

Watanabe et al.

[11] Patent Number: 4,985,884
[45] Date of Patent: Jan. 15, 1991

[54] DISK SHAPED RECORDING REPRODUCTION DEVICE

[75] Inventors: Hidetaka Watanabe; Kanji Fukunaga, both of Hyogo, Japan

[73] Assignee: Mitsubishi Denki Kabushiki Kaisha, Tokyo, Japan

[21] Appl. No.: 250,457

[22] Filed: Sep. 28, 1988

[30] Foreign Application Priority Data

Nov. 2, 1987 [JP] Japan .......................... 62-168228[U]

[51] Int. Cl.$^5$ ................................. G11B 3/60
[52] U.S. Cl. ..................... 369/263; 248/636; 248/562
[58] Field of Search ............. 369/258, 263, 264, 75.1, 369/75.2; 181/207-209; 248/562, 638, 636

[56] References Cited

U.S. PATENT DOCUMENTS

| | | | |
|---|---|---|---|
| 2,157,158 | 5/1939 | Blessing | 369/263 |
| 3,786,288 | 1/1974 | Joannou | 369/263 X |
| 4,054,291 | 10/1977 | Maeda | 369/263 X |
| 4,225,142 | 9/1980 | Zolt | 369/263 X |
| 4,475,184 | 10/1984 | Cooper et al. | 369/263 |
| 4,633,973 | 1/1987 | Kitano | 181/207 |

FOREIGN PATENT DOCUMENTS 62-146748 1/1987 Japan .
62-85993 6/1987 Japan .

Primary Examiner—William M. Shoop, Jr.
Assistant Examiner—D. Martin
Attorney, Agent, or Firm—Townsend and Townsend

[57] ABSTRACT

In conventional disk shaped recording reproduction devices, vibrations have been absorbed by the up and down motion of protruding rods which are supported in a viscous liquid such as a silicon oil. According to this invention, an inexpensive elastic body is used, which is heated by a heater so that, by maintaining the temperature of the elastic body within a certain range, the deterioration of the vibration absorbing characteristics of the elastic body with temperature changes is considerably reduced and the elastic body can be made more compact.

4 Claims, 3 Drawing Sheets

DISK SHAPED RECORDING REPRODUCTION DEVICE

BACKGROUND OF THE INVENTION

This invention relates to disk shaped recording reproduction devices for reading information from a disk and particularly to mechanisms which prevent vibrations in these devices.

FIG. 3 shows the principal mechanism of a conventional disk shaped recording reproduction device—a compact disk drive. An optical pickup 2, which reads the information on a compact disk 1, is located near the turntable (not shown) which turns when the compact disk 1 is loaded. A clamp 3, which presses against the compact disk 1 and makes it turn together with the turntable, is located above the turntable. The clamp 3 is attached to a free end of a clamp arm 4. The clamp arm 4 is pivoted to a deck base 6 which is supported by four dampers 5 and springs 20.

FIG. 4 is a cross section of the damper 5. A viscous liquid 8 made from a silicon oil which is resistant to viscosity changes and deterioration accompanying temperature changes is sealed within a cylindrical rubber elastic body 7. A protruding rod 9 is placed in the center of the elastic body 7. A disk shaped resistance plate 10 is placed at the lower end of the protruding rod 9.

In the conventional compact disk drive as described above, when the compact disk 1 is loaded onto the turntable, the clamp arm 4 falls and the clamp 3 holds the compact disk 1 against the turntable. Therefore, the motor (not shown) turns the turntable, compact disk 1, and clamp 3 together without the compact disk 1 slipping, and the optical pickup 2 is able to read optically the information on the compact disk 1. Moreover, the damper 5 absorbs the vibrations of the deck base 6 in order to prevent errors as the information on compact disk 1 is read.

In the compact disk configured as described above, the damper 5 is used to prevent vibration while the viscous fluid 8 is a silicon oil which has a small viscosity drop as its temperature increases. However, the good vibration damping characteristics cannot be maintained because the viscosity of the liquid declines with increasing temperature throughout the entire temperature range, for example, from $-30°$ C. to $70°$ C., to which the viscous fluid is exposed under automobile operating conditions. Moreover, sealing the silicon oil with a thin rubber film makes manufacturing more difficult and increases production costs.

SUMMARY OF THE INVENTION

It is an object of this invention to maintain the good vibration damping characteristics of a damper even if the ambient temperature of the damper should vary.

Another object of this invention is to improve the manufacturability and reduce the size of the damper.

Still another object of this invention is to provide a recording reproduction device which has a low manufacturing cost.

According to this invention, the elastic body that holds the deck base is warmed by a heater that keeps its temperature constant. Excellent damping characteristics are obtained by keeping the temperature of the elastic body constant.

These objects together with others not mentioned will become clear to those skilled in the art from the following description.

DESCRIPTION OF THE PREFERRED EMBODIMENT

Figure 1:
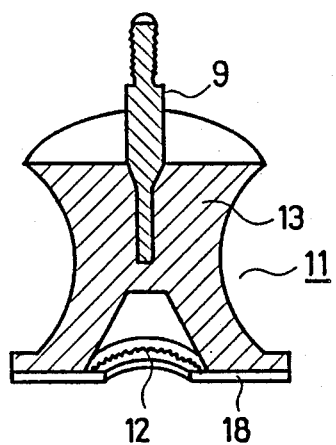
FIG. 1 is a perspective view of the principal components of this invention.
Figure 3:
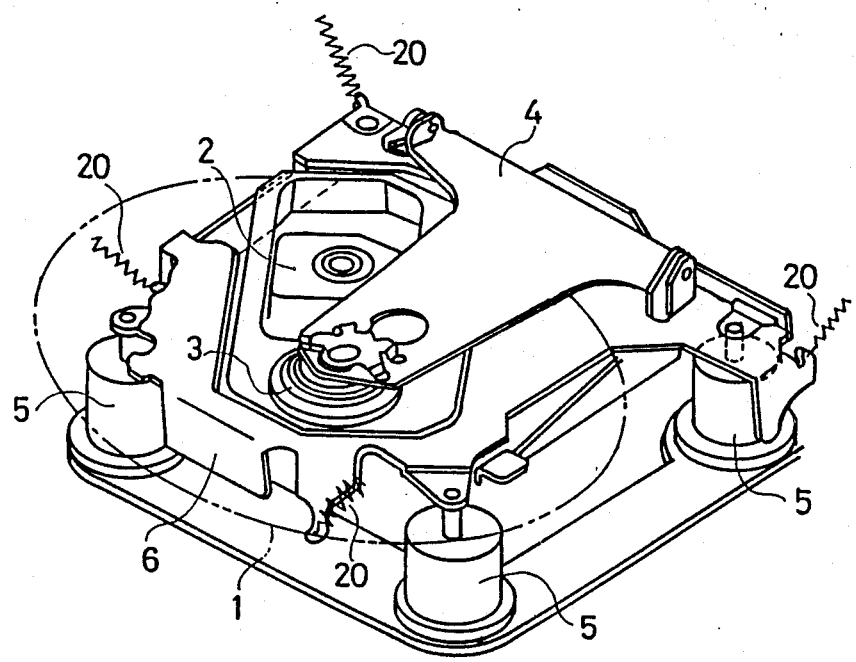
FIG. 3 is a perspective view of the principal components of a conventional compact disk drive.
Figure 4:
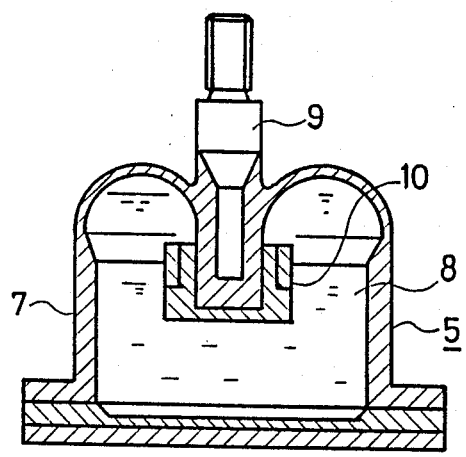
FIG. 4 is a sectional view of the damper of a conventional device.

FIG. 1 shows a damper 11 according to an embodiment of the invention which may replace the conventional damper 5 as shown in FIG. 3. The damper 11 is made from an elastic body 13, such as rubber, which has good vibration damping throughout the temperature range and may be manufactured cheaply. A metal plate 18 is placed to the bottom of the elastic body 13. A heater 12 is attached to the top of the metal plate 18.

Figure 2:
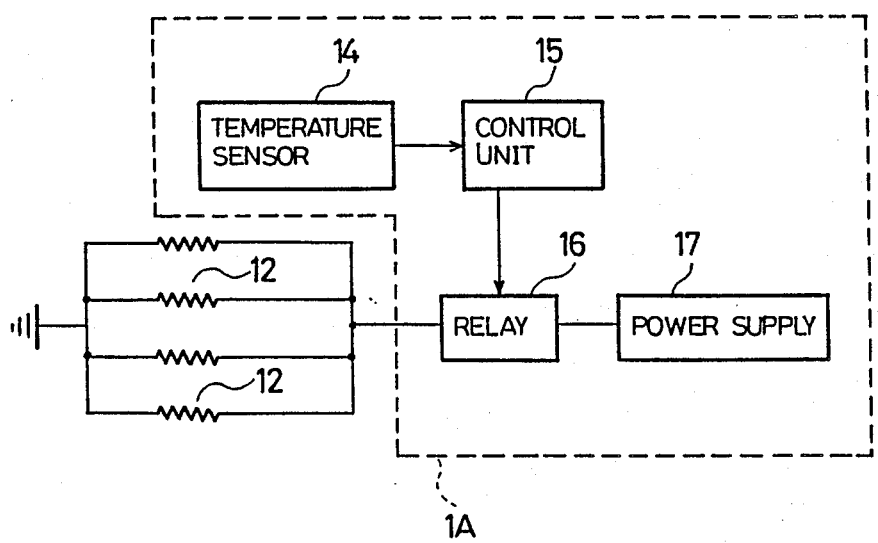
FIG. 2 is a circuit diagram of the electrical portion of this invention.

FIG. 2 shows the control device 1A. A temperature sensor 14 is directly attached to or located beside the elastic body 13 in order to measure the temperature of the elastic body 13. The other major components in the block diagram are a control unit 15, a relay 16 and a power supply 17.

Figure 5:
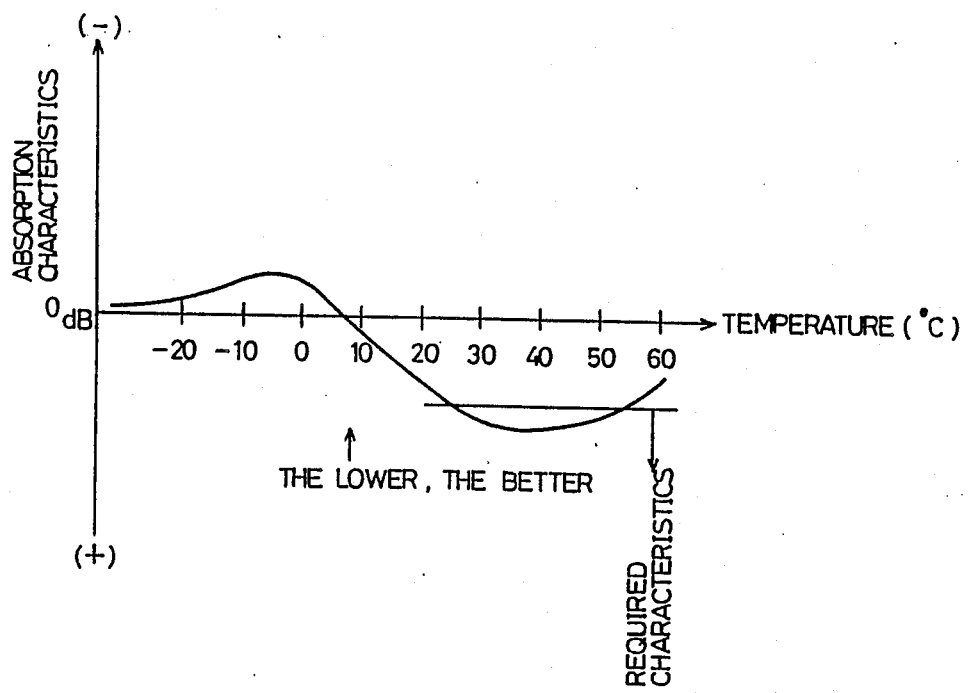
FIG. 5 is a chart of the temperature vs. vibration damping characteristics of the damper in a certain frequency band.

If the ambient temperature of the damper 11 of the configuration described above declines, as it does during the winter, the elastic body 13 hardens. If damper 11 has the temperature characteristics of FIG. 5, its vibration damping will be inadequate at temperatures of $25°$ C. or less. This has resulted in lower audio reproduction quality in automotive compact disks due to automobile vibrations.

Therefore, in this invention, the temperature sensor 14 measures the temperature of the elastic body 13 and sends the sensor output signal to the control unit 15. The control unit 15 compares the sensor output signal with the elastic body optimum temperature set beforehand and sends a signal to the relay 16 if the sensor signal exceeds the temperature value set beforehand by a preset value. This signal turns the relay 16 on for a preset period of time. The relay 16 connects the heater 12 with the power supply 17. This boosts the temperature of the elastic body 13 to the high temperature range where its vibration damping characteristics are best.

Although the explanation of the embodiment described above has dealt with one type of disk shaped recording reproduction device or compact disk drive, this invention is not limited in its applications to compact disk drives. This invention is also useful for magnetic disk drives and laser disk drives. In these devices as well, the heater 12 can be directly connected to or placed beside the elastic body 13.

According to the invention, the elastic body is kept in the adequate vibration damping range by maintaining the temperature of the damper which supports the deck base within a preset range. The heater heats the elastic body to maintain the temperature of the elastic body within the preset temperature range in which it has good damping characteristics even if the ambient temperature of the elastic body falls. Thus a disk shaped recording reproduction device having good vibration damping characteristics can be obtained. The simple damper design, moreover, makes this invention inexpensive to manufacture.

What is claimed is:

1. A disk shaped recording reproduction device including a turntable upon which a disk is loaded, a pickup which reads information recorded on said disk, a deck base supported by a damper, a clamp arm pivoted to said deck base in such a way that it moves freely up and down, and a clamp which is attached to a free end of said clamp arm to hold said disk between itself and said turntable, wherein the improvement comprises:

an elastic body for said damper which has good vibration damping characteristics within a certain temperature range;

a heater for applying heat to said elastic body; and a control device for controlling said heater so that the temperature of said elastic body remains within said temperature range.

2. The disk shaped recording reproduction device of claim 1, wherein said elastic body is made of rubber.

3. The disk shaped recording reproduction device of claim 1, wherein said elastic body is attached to a metal plate which is heated by said heater attached to said metal plate.

4. The disk shaped recording reproduction device of claim 1, wherein said control circuit comprises a sensor for detecting the temperature of said elastic body, a relay for turning the power to said heater on and off, a control unit for turning said relay on and off in response to output signals from said sensor and a power supply for furnishing electric power to said sensor, heater, and control unit.

* * * * *